2,711,676

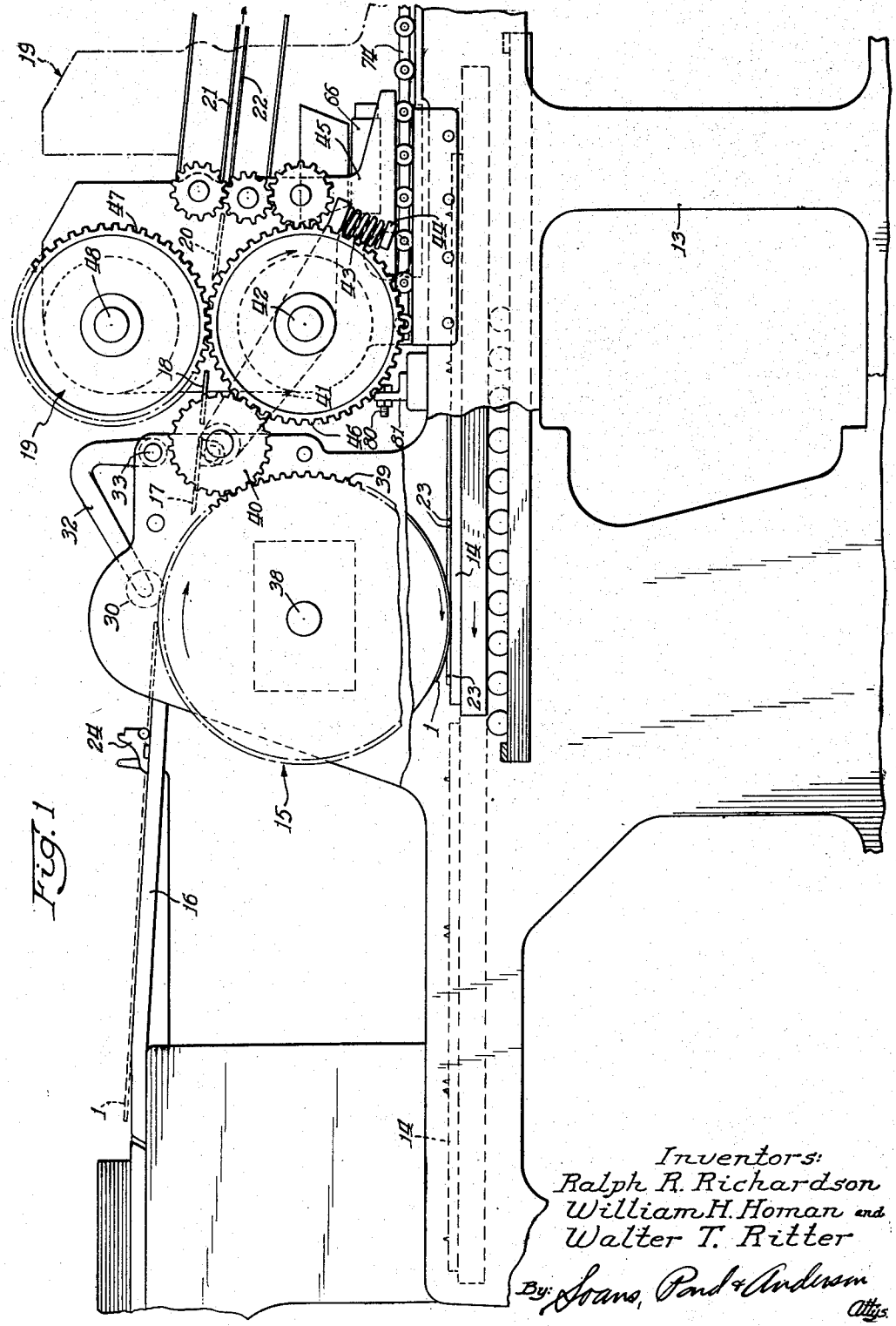

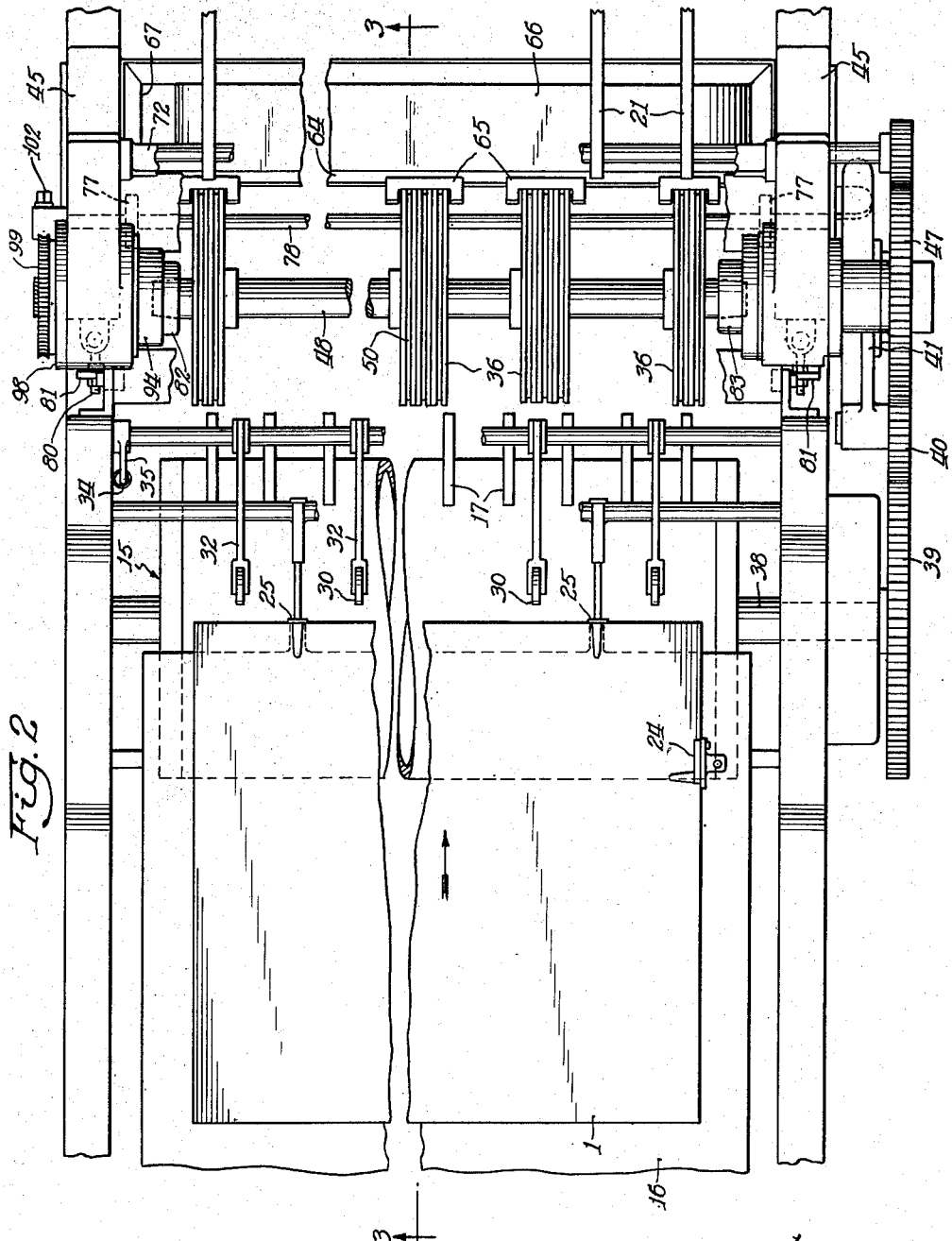

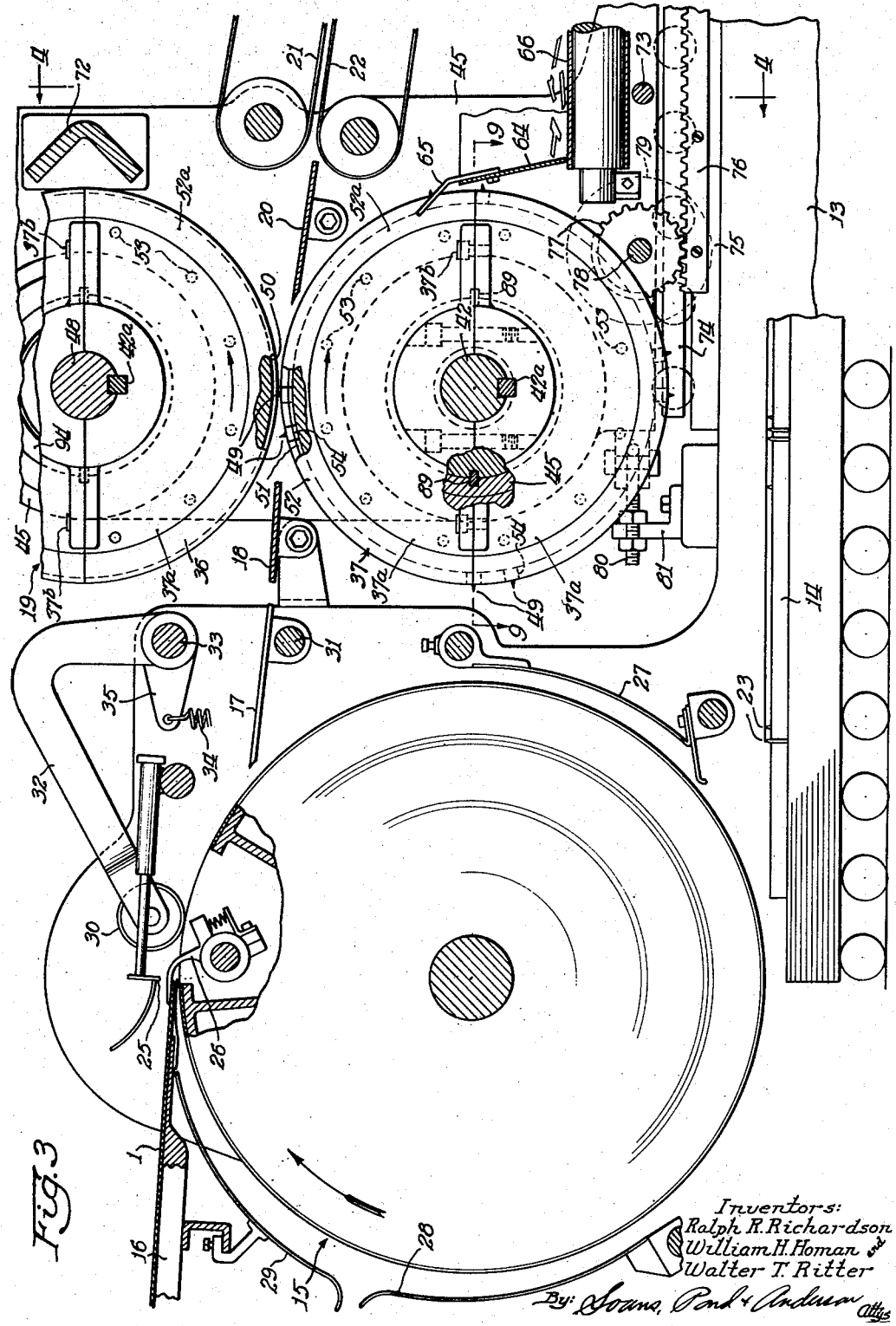

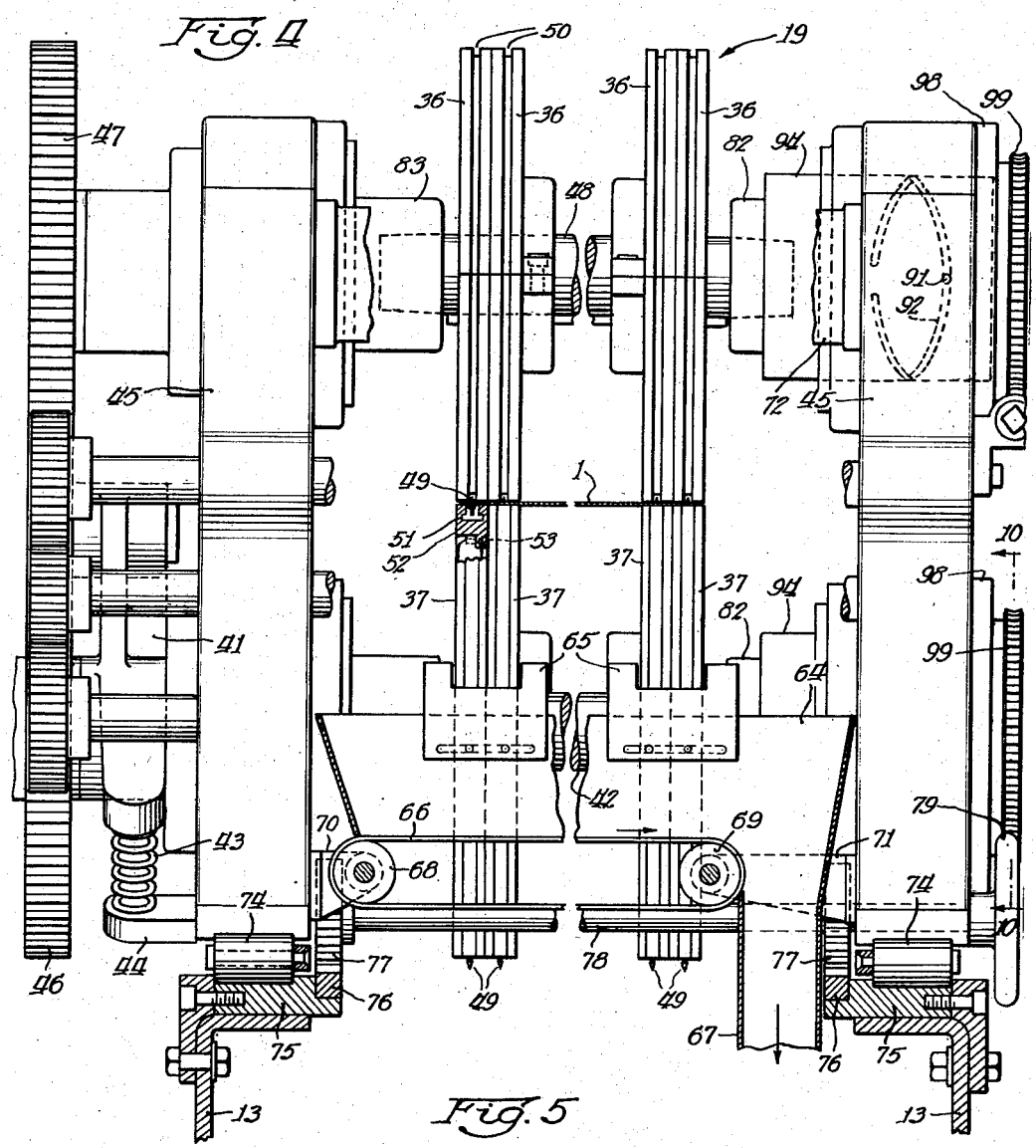

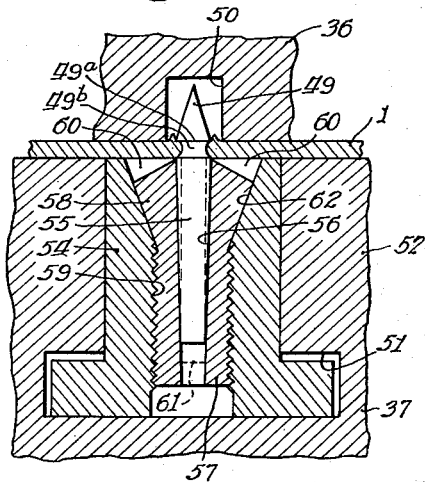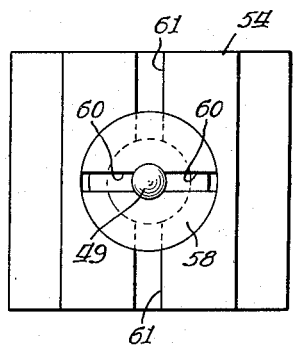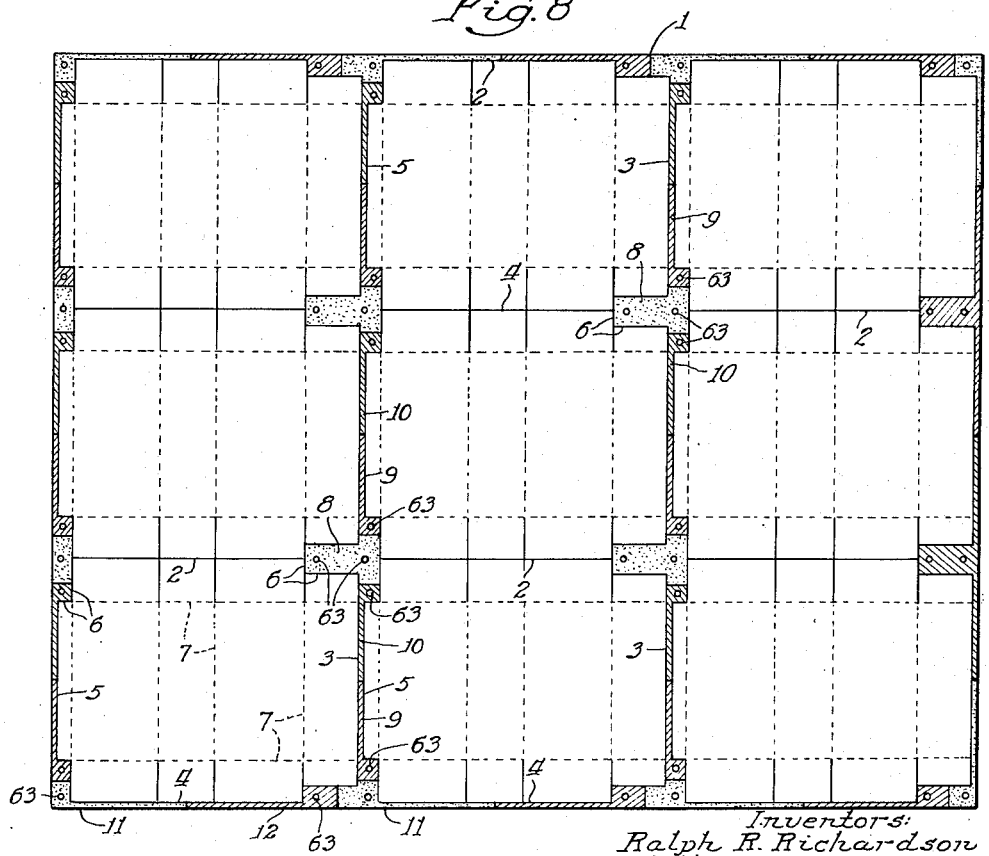

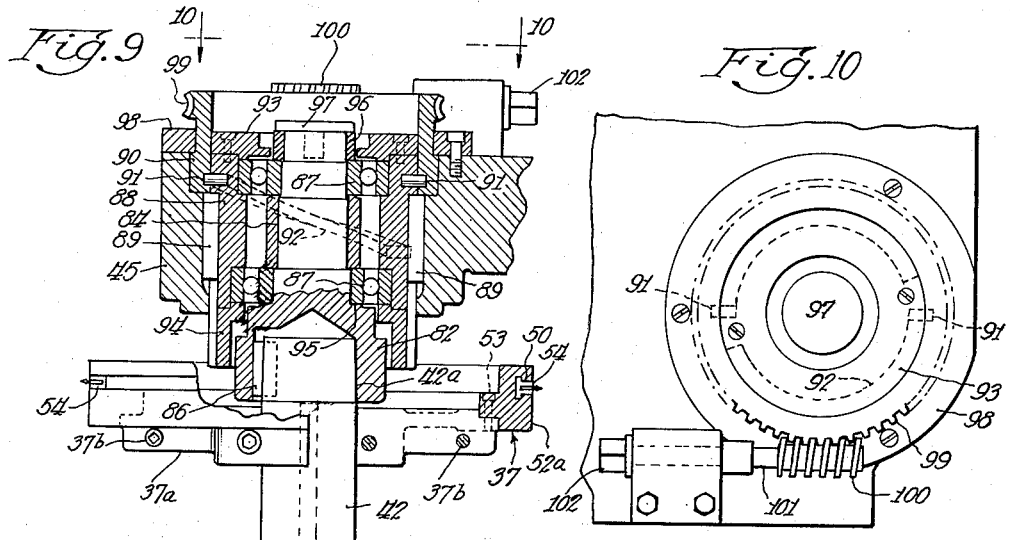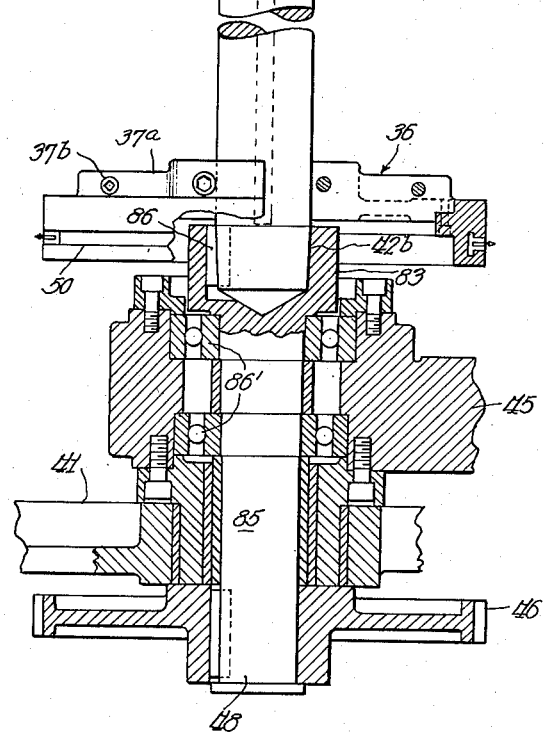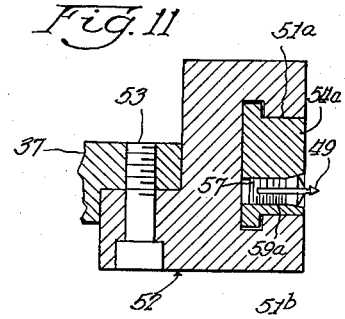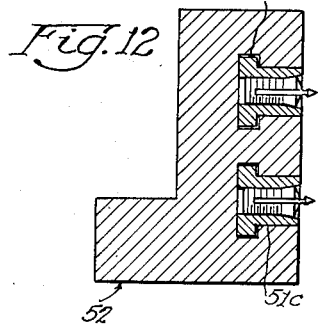
Inventors:
Ralph R. Richardson
William H. Homan and
Walter T. Ritter

United States Patent Office 2,711,676
Patented June 28, 1955

WASTE REMOVING EQUIPMENT FOR BOX BLANKING APPARATUS

Ralph R. Richardson, Chicago, William H. Homan, Oak Lawn, and Walter T. Ritter, River Forest, Ill., assignors to Chicago Carton Company, Chicago, Ill., a corporation of Delaware Application September 29, 1949, Serial No. 118,516

9 Claims. (Cl. 93—36)

This invention relates to equipment which is associated with box blanking apparatus for removing waste material which occurs in the cutting of the blanks, around the edges thereof and between adjacent edge portions of adjacent blanks cut from the same sheet.

In the box making industry, it has been conventional practice up to the present time to cut one or more box blanks out of a single sheet of box making material, such as paper board, the cutting being done in such a manner that waste material will normally remain in its normal sheet position relative to the box blanks.

The cut sheets are collected in stacks and waste is then removed from the stacked sheets or blanks by striking the waste portions with a hammer or the like. The attachment of the waste material to the blanks is not much more than frictional attachment although the cutting may be effected in such a manner as to leave a very light, positive, continuous bond or a few light, spaced bonds between the waste material and the box blank. In any event, the waste material is removable without further cutting operations and by merely pushing or pulling the waste material from the box blank.

The main object of the present invention is to provide equipment which will automatically remove the waste material from box blanks as a part of the operation of forming the box blanks; to provide such equipment which may be applied to existing conventional box blanking machines; to provide such equipment and to associate it with a conventional box blank cutting machine in such a manner that the added equipment will not interfere with the normal operation of the conventional box blanking equipment; to provide such waste removing equipment and to mount it on the conventional box blanking equipment in such a manner that normal access to the box blanking equipment for setting up purposes may be readily provided even though the waste removing equipment is mounted for operation within the space normally provided for such access purposes; to provide such waste removing equipment which is adjustable so as to be adapted to remove waste from various portions of the width and length of the sheets which are converted into box blanks; and to provide mechanism of the character indicated which will be simple, effective and durable in operation.

Other objects and advantages of the invention will be understood by reference to the following specification and accompanying drawings (5 sheets) in which there is illustrated waste removing equipment embodying a selected form of the invention and one manner of associating it with a conventional box blanking machine.

In the drawings,

Fig. 1 is a fragmentary side elevation of a box blanking machine to which one form of waste removing equipment has been applied according to the present invention;

Fig. 2 is a plan view of the mechanism shown in Fig. 1;

Fig. 3 is a longitudinal sectional view on a plane indicated by the line 3—3 of Fig. 2;

Fig. 4 is a section on a plane represented by the line 4—4 of Fig. 3;

Fig. 5 is an enlargement of a portion of Fig. 3;

Fig. 6 is a cross section on an enlarged scale on the plane represented by the line 6—6 of Fig. 5;

Fig. 7 is a plan view of a portion of the mechanism shown in Fig. 6;

Fig. 8 is a plan of a sheet of box making material, such as paper board, which has been cut to divide the sheet into a plurality of blanks which are subsequently to be converted into boxes;

Fig. 9 is a plan section on the line 9—9 of Fig. 3;

Fig. 10 is a fragmentary side elevation of the area indicated by the line 10—10 of Figs. 4 and 9; and Figs. 11 and 12 are fragmentary sections representing modifications of a detail of construction.

In Fig. 8 there is represented a sheet 1 of box board, this sheet being of a size from which a plurality of box blanks are to be cut. The sheet may have the box blanks preprinted on the sheet so that upon cutting of the blanks from the sheet they are completed and ready for setting up. For the purposes of the present invention, it makes no difference whether the box blanks are or are not printed on the sheet nor does it make any difference whether or not the blanks are to be cut from successive sheets or from a continuous web of box material. In this explanation of the invention, cutting from sheets is illustrated as being the more common procedure.

As represented in Fig. 8, the sheet 1 has been cut along lines 2, 3, 4 and 5 which represent the outside edges of a generally rectangular box blank. In the particular blank shown, corners are recessed, these corners being formed by suitable angle cuts represented at 6. Folding or score lines 7 may also be formed in the box blanks in connection with the cutting thereof.

As will be seen from an inspection of Fig. 8, when a plurality of box blanks of the illustrated character are to be cut from the same sheet of material, various waste areas will occur. Some of such waste areas are designated 8, 9, 10, 11 and 12. These waste areas have been variously shaded in Fig. 8 to more clearly illustrate sections of such areas which, according to the present invention, are to be removed in sections as illustrated.

It may be observed that the various box blanks shown in Fig. 8 have their adjacent ends separated so as to form waste strips 9 and 10 whereas the side edges of adjacent blanks are formed by a single line of severance. Because of the endwise travel of the sheets of box material through a rotary path of travel and for other practical reasons, it is preferable to separately form the adjacent ends of the boxes as described, although this is not always necessary.

In some instances, it may also be preferred to separate the box blanks in the transverse direction so as to leave some waste material between the adjacent side edges of the blanks. However, in almost all box formation, waste material will occur at the corners although even this is not an invariable rule. In some instances, the box blanks may be of plain, rectangular shape with no reentrant angles and the only waste material may be occasioned around the outer edges of the sheet or around the outer edges of the sheet and between adjacent ends and/or sides of the blanks cut from the sheet. Depending upon the shape of the box blanks to be formed, there is however practically always some waste material which is to be removed, and the illustrated cut sheet is to be regarded merely as typifying one arrangement for purposes of explaining the present invention.

As already indicated, it is the purpose of the present invention to automatically remove the waste sections such as 8, 9, 10, 11 and 12, so as to thereby eliminate the relatively slow and cumbersome manual operation of hammering the waste from the blanks.

In Fig. 1, there is illustrated a frame structure 13 which may be regarded as the frame of a conventional box blank cutting machine which embodies a reciprocating die plate 14 and a rotary sheet carrier 15. The sheet carrier 15 grips the leading edge of a sheet 1 on a positioning table 16 while rotating in a clockwise direction as viewed in Fig. 1, carries the sheet through a circular path of travel and presses it into cutting and scoring relation to the die plate 14 which is automatically moved endwise in properly timed relation to the rotation of the carrier cylinder 15 to cause the sheet 1 to be properly cut and scored.

The cutting and scoring of the sheet occurs during one rotation of the cylinder 15. During the next rotation of the cylinder 15 the cylinder is elevated slightly so as to clear the die plate 14 while the latter is retracted from the finishing position represented in broken lines in Fig. 1, to its starting position which is slightly to the right of that illustrated in full lines in Fig. 1.

During the second turn of the cylinder 15, the cut sheet is released from the carrier cylinder 15 and directed endwise over guides or supports 17 and 18 to waste removing mechanism indicated in its entirety at 19, and thence over a support or guide 20 to suitable conveying belts or straps 21 and 22, which carry the box blanks to a stacking table or other receiving means.

The mechanism for driving the carrier cylinder 15 and the die plate 14 is well known and need not be described in detail in this application. They are, however, positively driven in carefully synchronized relationship to each other. Cutting knives are indicated at 23 projecting upwardly from the die plate, these cutting knives cooperating with the carrier cylinder 15 which constitutes a backing roll against which the sheets are cut by said cutting knives. Scoring knives are also usually provided as a part of the die plate 14 but they are not herein illustrated.

The sheets 1 are usually fed by hand to predetermined position wherein the carrier cylinder 15 may pick them up. This starting position of the sheets 1 is determined by a side guide 24 which is suitably mounted on the table 16 and by end stops 25 (Figs. 2 and 3) which are rocked vertically from sheet stopping position to an elevated position as shown in Fig. 3, to permit the sheet to be picked up and advanced by the cylinder 15.

As shown in Fig. 3, the cylinder 15 is equipped with a rockably mounted gripper 26 which grips the leading edge of the sheet 1 against the surface of the cylinder so that the sheet 1 will thereupon be carried forwardly through a rotary path of travel on the outside of the cylinder 15.

The mechanism for operating the gripper 26 is a standard part of a conventional box blanking machine and hence is not herein explained. Similarly, the mechanism for rocking the stops 25 up and down is well known and is not herein explained.

Various guides, such as indicated at 27, 28 and 29 are also associated with the cylinder 15 to prevent the trailing end portion of the sheet 1 from springing away from the cylinder, it being understood that such trailing end portion is free of attachment to the cylinder and may, if not restrained, spring away. The sheets fed to the blanking mechanism are usually of a length equal to from about ½ to ¾ of the circumference of the cylinder although they may be longer or shorter.

When the leading end of the sheet 1 has traveled through its circular path on the circumference of the cylinder 15 and when such leading end reaches a point slightly beyond (to the right of) a series of rollers 30, the gripper 26 is released so that the leading end of the sheet will tend to move forwardly in continuation of the plane of the supporting table 16 and over the guide 17. The guide 17 is usually in the form of a series of strap-like members carried by a rock shaft 31 which is rocked in synchronized relation to the travel of the cylinder 15 so that when the released leading end of a sheet 1 approaches said guide straps 17, the receiving ends thereof will be lowered into close proximity to the cylindrical surface of the cylinder 15 so as to strip the sheet from the cylinder in the event that there is any tendency for the sheet to continue to follow the cylinder.

The rolls 30 are carried by arms 32 which are secured to a shaft 33 which is journaled in the side frame structure of the machine. One or more springs 34 stretched between a fixed part of the frame structure and an arm or lever 35 extending from the shaft 33 serve to yieldingly urge the rollers 30 into engagement with the cylinder 15. The rollers 30 are thereby operative to press the sheets 1 against the surface of the rotating cylinder 15 so that even after the leading edges of the sheets are released, rotation of the cylinder continues to feed the sheets forwardly.

The sheets are usually long enough to span the distance from the nip of the pressure rolls 30 and cylinder 15 and the nip between one or more pairs of waste removing rolls or discs 36 and 37 of the waste removing mechanism 19. These waste removing discs are also driven in synchronized relation to the cylinder 15 by suitable driving means and they are operative to grip the box material so as to also propel the same along its described path of travel. In one suitable gear drive for said discs 36 and 37, a shaft 38 which is rigid with the cylinder 15 has secured to it, a large gear 39 which meshes with an idler gear 40. The idler gear 40 is journaled in a bearing on one end of an arm 41 which is rockably mounted on a shaft 42 of the waste removing mechanism. The other end of said arm 41 is resiliently urged in an upward direction by means of a compression spring 43 which is interposed between the free end of said arm 41 and a suitable supporting seat or lug 44 which is carried by one of the side frame members 45 of the waste removing mechanism. The spring 43 thus serves to urge the idler gear 40 constantly into engagement with the gear 39 while at the same time permitting slight upward movement of said gear 39 in connection with the upward movement of the cylinder 15 for causing the latter to clear the die plate as already explained. The idler gear 40 also meshes with a gear 46 on the shaft 42 and this gear 46 meshes with a similar gear 47 on a shaft 48.

The waste picker or removal discs 36 and 37 are mounted on the shafts 48 and 42 respectively so as to rotate in unison therewith. As the sheets pass between the picker rolls 36 and 37, the waste material is impaled by suitable pins and thereby withdrawn from the plane of the sheet which continues its endwise directed travel over the guide 20 and into the control of the conveyor belts 21 and 22.

The waste picking mechanism may be in the form of upper and lower cylinders extending continuously across the width of the machine and provided with means whereby waste impaling pins or the like may be mounted in various required locations circumferentially and longitudinally of such rolls. However, in this instance, the waste removing means is illustrated as being in the form of a plurality of sets of upper and lower discs, each upper disc being designated 36 and each lower disc being designated 37.

The lower discs 37 are provided with radially projecting impaling pins 49 which are adapted to penetrate the waste portions of the box making material. The upper discs 36 are provided with grooves 50 extending circumferentially therearound intermediate their thicknesses to receive the projecting impaling pins 49 (see Figs. 4 and 6).

The impaling pins 49 on the lower discs 37 may be fixedly or adjustably mounted on the circumference of the discs. In order that the mechanism may be adjusted to remove waste from various locations in a sheet, it is preferable that the impaling pins be mounted so as to be adjustable around the circumference of the discs, and the discs are mounted on the shafts so as to be adjustable along the lengths thereof so as to permit setting of the impaling pins at the desired positions transversely of the direction of travel of the sheet from which waste is to be removed.

Many forms of adjustable pin mounting may be employed. In this instance, such an adjustable mounting is provided by forming inverted T-shaped slots 51 in peripheral portions 52 of the discs 37. These peripheral portions may conveniently be in the form of semi-circular, inwardly flanged ring sections 52a—52a (Fig. 3), which are bolted as indicated at 53 (see also Figs. 4 and 11) or otherwise secured to the disc bodies, two of such sections cooperating to form the said peripheral portion 52 of each disc 37. The desired number of impaling pin carrying and mounting blocks 54 are inserted into the slots of the ring sections 52a at the ends thereof before they are assembled with the respective disc bodies. Hence, when the disc bodies and ring sections are completely assembled, the pin carrying blocks are adjustable to any desired position around the circumference of the discs. The disc bodies may be formed of half sections 37a—37a bolted together as indicated at 37b (Fig. 3), to tightly clamp said bodies on the shaft to which the discs are keyed as shown at 42a.

The blocks 54 are of generally rectangular form and of inverted T-shaped cross section as shown in Figs. 6 and 7, so that these blocks may be adjusted as aforesaid, circumferentially around the discs 37 in the slots 51.

The impaling pins 49 have tapered stem portions 55 which are removably seated in a correspondingly tapered bore 56 in a pin anchor which has a threaded cylindrical lower portion 57 and a frusto-conical upper or head portion 58.

The cylindrical portion 57 of each pin anchor is externally threaded to fit a tapped opening 59 in the pin mounting block 54. The head portion of each pin anchor is provided with transversely extending slots or recesses such as indicated at 60, for receiving the prongs of a spanner wrench or similar tool, whereby the pin anchor may be driven into the threaded opening 59 of the mounting block. The mounting block 54 has its upper portion slotted as indicated at 61, so that the upper portion of the block is slightly flexible and hence expandible into tight fitting engagement with the walls of the slot 52 as an incident to the expanding effect of the frusto-conical portion 58 against the correspondingly counterbored wall portions 62 of the pin mounting block 54.

It will be seen that the pin mounting block may be adjusted to and locked in any selection position around the circumference of the discs.

The upper discs are of the same construction as the lower discs except that the peripheral portions of said upper discs have the plain grooves or slots 50 therein instead of the inverted T-shaped slots of the lower discs.

In Fig. 8, the circles designated 63 within various waste areas represent points at which impaling pins 49 would impale the respective waste areas. For a large area such as the area 8, a pair of pins may desirably be employed. For smaller areas such as the areas 9, 10, 11 and 12, a single impaling pin may be sufficient to remove the material.

In one embodiment of the invention the pins 49 may have an outside diameter of about 1/16-inch across the base 49a of the point portion which will usually project through the waste material. Below the point portion an undercut 49b is desirably provided so that the impaling pin will, in effect, be a barbed or spear point which, once passed through the material, will have an effective grip on the material to pull the same out of its normal sheet position and away from the areas of the box blanks.

If it is necessary to impale very narrow strips of waste material, say strips less than about 1/8-inch in width, flattened, or wide but thin spear pointed pins may be employed with the width extending in the direction of the length of the material to be removed so as to avoid breaking of such narrow strips incident to the impalement thereof. Ordinarily, a waste piece such as the pieces 9 and 10, may be removed by impaling any enlarged portion thereof as indicated in Fig. 8.

Further referring to Fig. 8, it will be observed that in the suggested arrangement shown, two waste removing disc units are required at the opposite sides of the blank (the sides of the blank being the top and bottom edges of Fig. 8) and that sets of three such impaling discs are required side by side for removing the waste material at points intermediate the side edges of the blank. Accordingly, as shown in Fig. 2, pairs of waste removing discs are mounted at the opposite ends of the supporting shafts and sets of three discs are mounted at intermediate points on said shafts.

Again referring to Fig. 8, it will be observed that waste material is to be removed at the opposite ends of the sheet and, in this instance, at two points intermediate the ends, a total of four points along the length of the sheet. Accordingly, as shown in Fig. 3, there are four sets of impaling pins 49 spaced around the circumference of the disc shown.

In the arrangement shown, the circumference of the picker disc 37 is substantially the same as the length of sheet which is fed to the blanking mechanism so that for each sheet, the discs 37 make one complete rotation. The gearing 39, 40 and 46 is, of course, appropriately selected to effect rotation of the picker discs at the same surface speed as the carrier roll or drum 15 and hence with a surface speed which corresponds to the speed of travel of the box material. In the illustrated arrangement the picker rolls make three revolutions to each two revolutions of the carrier roll, two of the revolutions of the picker rolls being idle rotations. It is not essential that the circumference of these picker discs correspond to the length of the sheet being handled; instead the discs may be of smaller or larger circumference and provided with picker pins at such locations that the waste portions of the sheet will be properly impaled and withdrawn from the sheet as an incident to the diverging paths of travel of the blanks and the picker pins. If smaller picker discs or rolls are used, one or more of the picker pins thereon may be brought into operative relation to the sheet two or more times.

To strip the impaled waste material from the impaling pins, suitable stripping mechanism may be provided. One such mechanism consists of a cross plate 64 which is suitably supported by attachment to the side frames 45 of the waste removing mechanism. This plate 64 is disposed at a slight angle to the vertical as shown in Fig. 3, and its upper edge is spaced from the pin carrying discs 37 sufficiently to clear the impaling pins. Forked strippers 65 are secured to said plate 64 and project upwardly therefrom and into embracing relationship to the discs as will be understood by inspection of Figs. 3 and 4 of the drawings. These forked stripper members 65 are operative to engage and remove the waste material carried downwardly by the impaling pins 49.

The waste or scrap material may be deposited on a suitable conveyor 66 which may be arranged to discharge the waste or scrap into a conduit 67 by which the material is conducted to a suitable disposal means or collecting bin. If desired, suction may be employed in the conduit 67 to facilitate movement of the scrap therethrough.

The conveyor 66 may be suitably driven by an electric motor provided for that purpose, or it may be driven by suitable driving connection to any of the driven shafts of the main mechanism. This driving means forms no part of the present invention and is therefore not illustrated. The conveyor may be supported by suitable pulleys 68 and 69 carried by brackets 70 and 71 which are mounted on the side frames of the apparatus (see Fig. 4).

The side frames 45 which support the waste removing mechanism, are rigidly interconnected by cross members and tie rods such as indicated at 72 and 73, and the frame structure thus formed is movably supported on the main frame structure 13 of the box blanking machine through the agency of roller carriages 74 interposed between the lower edges of each of the side frames 45 and suitable tracks 75 on the main frame structure 13.

Rack bars 76 are secured to the inner edges of the respective tracks 75 for cooperation with gears 77 carried by a cross shaft 78. This cross shaft 78 is journaled in the side frames 45 and is adapted to be manually rotated through the agency of a hand wheel 79 to thereby cause the gear wheels 77 to roll along the racks 76 whereby the side frames 45 and the various parts carried thereby are caused to move away from the cylinder 15. By portably mounting the picker structure in this manner, the latter may readily be moved away from the cylinder 15 to afford free working space between the picker structure and the cylinder 15, thereby giving working access to the cylinder and die plate, this being highly desirable for cleaning, adjusting, set-up, and other purposes.

To anchor the picker structure in the operative position illustrated in Fig. 3, any suitable locking arrangement may be provided. In this instance, such a locking arrangement is shown as comprising an eye bolt 80 which is pivoted to the front edge of each side frame 45 in such an arrangement that its stem portion may be swung into or out of a slot in an upstanding bracket 81 carried by each side of the main frame structure 13. Suitable nuts on the stem portion of the eye bolt permit the eye bolt to be clamped in anchoring position to the bracket 81, and also some adjustment in respect of the working position of the picker structure relative to the cylinder 15. In Fig. 1 the picker structure is shown in operative position in full lines and in offset, inoperative position in dotted lines.

While in the described construction the waste removing discs may easily be adjusted to remove waste from various points of a sheet, both lengthwise and crosswise of the sheet, it is sometimes preferable to avoid changing the setting of the discs on their shafts and instead, to substitute another shaft with a differently arranged set of picker discs for a given requirement. To facilitate such substitution, the shafts 48 and 42 are mounted in bearings, one of which is retractable so as to disengage one end of the shaft, thereby to permit the shaft to be swung laterally and then moved endwise out of the other bearing. This arrangement is shown in Fig. 9 wherein the mounting of the lower shaft 42 is illustrated. Both picker shafts (42 and 48) may be mounted in the illustrated manner.

The picker shaft 42 has its ends slightly tapered as indicated at 42a and 42b, to fit correspondingly tapered sockets in enlarged portions 82 and 83 respectively, of stub shafts 84 and 85. Said shafts 84 and 85 are, in effect, extensions of the picker shaft and they are keyed to the tapered ends of the picker shaft as indicated at 86.

The shaft 85 is supported for free rotation in antifriction bearings 86' which are supported by appropriate seats formed in one of the frame sides 45, and it is held in axially fixed position.

The shaft 84 is mounted for free rotation in anti-friction bearings 87 which are seated in a sleeve 88. The sleeve 88 is slidable axially in the other frame side 45 but it is locked against rotation therein by means of keys 89 which are seated in matching keyways in the sleeve and the surrounding frame portion. A collar 90 surrounds an outer end portion of the sleeve 88 and is secured against axial movement but is rotatably mounted in the frame portion 45 so as to be rotatable about said non-rotatable sleeve 88. The collar 90 carries a pair of inwardly extending pins 91 which enter helical or cam grooves such as indicated at 92, in the outside surface of the sleeve 88. It will be seen that by rotating the collar 90 with its pins 91, the said pins will act against the sides of the cam grooves 92 to effect endwise movement of the sleeve 88. In one direction of rotation of the collar, the sleeve 88 will be moved outwardly so as to move the shaft 84 outwardly sufficiently to withdraw the socketed end portion 82 of said shaft from the tapered shaft portion 42a. Said socketed shaft is retracted to an extent to completely free said shaft portion 42a, whereupon the shaft with its various picker discs may be swung laterally to a position to permit endwise withdrawal of the shaft from the socket of the other shaft extension 83.

The bearings 87 are locked in place in the sleeve 88 by suitable end members 93 and 94 which may be bolted or otherwise attached to said sleeve 88. The bearings 87 are also anchored to the shaft extension 84 by being seated between a shoulder 95 on the shaft extension and a collar 96 which is suitably anchored to the outer end of said shaft extension, for example, by a fastening 97.

The collar 90 is anchored in place in the frame 45 by means of a ring 98 which is bolted or otherwise secured to the frame 45. To facilitate turning of said collar 90 for the purpose already explained, said collar is extended outwardly and provided with a worm wheel 99. A worm gear 100 carried by a shaft 101 suitably journaled on the side frame structure meshes with said worm wheel and effects rotation thereof and of said collar 90 when the shaft 101 and worm gear are rotated. The shaft 101 is provided with a square or otherwise suitably shaped end portion 102 to facilitate turning of said worm gear when desired.

The upper shaft 42 is similarly mounted so that both picker units may readily be withdrawn in their entireties with their respective picker discs remaining in fixed position. Substitute shafts and picker discs may be inserted and the movable bearing structure adjusted inwardly to operative position, this substitution being adapted to be made in a very short period of time so that changeover operations will not involve extensive and costly delays in operation of the mechanism.

The peripheral or ring portions 52 of the discs may embody various arrangements of pin-holding slots and pin-receiving slots. For example, in Fig. 11 the ring portion 52 is illustrated as having a widened inverted T-shaped slot 51a, and the pin mounting block 54a is correspondingly widened to fit the slot. The tapped opening 59a into which the pin anchor 57 is driven is located to one side of the center of the mounting block 54a so that by turning the mounting block one-half a turn, the center line of the impaling pin 49 will be adjusted laterally or crosswise of the periphery of the disc. This arrangement provides a two-position mounting for the impaling pins with reference to the width of the disc. The extent of adjustment of the pin depends, of course, upon the distance the pin is mounted from the center of the mounting block 54a.

In the arrangement shown in Fig. 12, the ring portion 52 in increased in width and provided with a pair of inverted T-shaped slots 51b and 51c, each receiving their own sets of impaling pins. This arrangement may, of course, be extended to provide for the mounting of more sets of pins in more closely spaced relation than is practicable if each set of impaling pins is carried by an independent disc.

Various changes in the described structure and arrangement may be made while retaining the principles of the invention which are such that waste or scrap material is automatically removed as a part of the box blanking operation. This arrangement effects substantial saving in labor costs and eliminates bottlenecks in box blank production which occur incident to the current practice of accumulating cut sheets in stacks and subsequently hammering off the waste material. By the described apparatus the employment of waste removing mechanism is made highly practical since it is such that it is very flexible and adjustable to remove waste from practically all conceivable portions of a sheet, and since adjustments and replacements of the picker structure require relatively simple operations which may easily be made in a very short time. Furthermore, the mounting of the picker structure so that it may be adjusted to an inoperative position avoids interference with the usual makeup operations on the cylinder and die bed. Also, the picker mechanism is such that its presence will not prevent operation of the blanking mechanism in the conventional way, it being merely necessary to disable the picker mechanism by removing the gear 40 or 46 and setting the picker discs in an idle position so as to permit the cut sheets to slide freely between the then stationary discs. In some instances the impaling pins may be removed and the discs operated in the normal manner in which they will function as auxiliary guide and feed rolls for the cut sheets.

By the described apparatus, the process of fabricating box blanks may be a substantially continuous process by which completely cut or scored blanks are formed and accumulated in stacks and then bundled for shipping purposes for transfer to machinery for setting up the boxes as desired.

We claim:

1. The combination with apparatus which cuts box blanks from sheets of box making material in such a manner that removable waste material is left in normal sheet position relative to the blanks, of a rotatable member provided with a pin projecting therefrom, said rotatable member being so mounted that said pin travels in an arcuate path toward and from the path of travel of the sheet material in said apparatus and into impaling engagement with said material, said rotary member and pin being driven in such synchronized relation to said cutting mechanism that said pin impales and withdraws said waste material from said normal position, said member having a circumferential slot in its peripheral portion and said slot having a bottom or inner portion of greater width than its top or outer portion, a pin mounting block positioned in said slot and having a cross sectional shape approximately corresponding to that of said slot, said block being movable in said slot circumferentially of said rotatable member and being slotted in the direction of the circumference of said member so as to be expandable transversely of said slot and having a tapped opening provided with a flared mouth portion, a pin anchor having a screw threaded portion and a conical head portion, said anchor being screwed into said tapped opening and said conical head portion engaging said flared mouth and effecting expansion of said mounting block into tight fitting engagement with the sides of said slot to thereby lock said mounting block in selected position of adjustment.

2. The combination with apparatus which cuts box blanks from sheets of box making material in such a manner that removable waste material is left in normal sheet position relative to the blanks, of a pair of frame members, a member rotatably mounted in said frame members and of less length than the distance between said frame members, said rotatably mounted member having means for engaging and removing said waste material as an incident to rotation of said member, and means for rotatably mounting said member in said frame members comprising a pair of stub shafts having separable supporting connections respectively, with end portions of said rotatable member, said shafts being respectively journaled in said frame members and one of said shafts being mounted for axial movement so as to permit endwise withdrawal thereof from supporting engagement with said rotatable member, thereby to facilitate removal and replacement of said rotatable member, and means rotatably but axially fixedly mounted in one of said frame members and associated with said axially movable shaft for effecting axial movement thereof as an incident to rotation of said means.

3. The combination with apparatus for cutting box blanks from sheets of box making material in such a manner that removable waste material is left in normal sheet position relative to the box blanks, a main frame supporting said box blank cutting mechanism, means for receiving said sheets from said cutting mechanism and conducting said sheets away from said mechanism, means operated in synchronism with said cutting mechanism for displacing said waste material during the movement of the blanks from said cutting mechanism to said receiving means, an auxiliary frame supporting said waste displacing means, said auxiliary frame and waste displacing means constituting a unitary structure and said auxiliary frame being mounted on said main frame for movement thereon from a position in which said waste displacing means is supported in an operative position adjacent said cutting mechanism to an inoperative position in which said waste displacing means remains intact as an operable unitary structure but is supported in spaced relation to said cutting mechanism so as to afford access to the latter, adjustable means for positioning said auxiliary frame in selected operative relation to said waste displacing means, and a separable driving connection between said cutting mechanism and said waste removing means comprising a variable-position driving element which is operative to drivingly interconnect said cutting mechanism and waste removing means throughout a predetermined range of operative positions of said waste removing means relative to said cutting mechanism within the range of positions permitted by said adjustable positioning means.

4. In apparatus for cutting box blanks from sheets of box making material, the combination of cutting mechanism comprising a rotating vertically shifting sheet carrier, and a reciprocating die plate which coacts with the bottom portion of said rotating sheet carrier when the latter is in a lowered position to cut box blanks from sheets in such a manner that removable waste material is left in normal sheet position relative to the box blanks, a main frame vertically shiftably supporting said carrier and horizontally reciprocably supporting said die plate for coaction as aforesaid, means for receiving said sheets from said carrier and conducting said sheets away from said carrier, rotating means operated in synchronism with said cutting mechanism for displacing said waste material during the movement of the blanks from said cutting mechanism to said receiving means, an auxiliary frame supporting said waste displacing means, said auxiliary frame being mounted on said main frame for movement thereon from a position in which said waste displacing means is supported in an operative position adjacent said cutting mechanism to a position in which said waste displacing means is supported in spaced relation to said cutting mechanism so as to afford access to the latter, means for releasably locking said auxiliary frame in the first mentioned position with said waste displacing means in said operative position, and means for drivingly interconnecting said rotating waste removing means and said rotating sheet carrier comprising a pair of gears respectively connected to said rotating sheet carrier and said rotating waste displacing means for rotation therewith, one of said gears being also shiftable vertically with said carrier and the other being movable toward and from said carrier in unison with said waste displacing means, and an idler gear normally meshing with both gears of said pair of gears with the axis of said idler gear disposed to one side of a plane through the axes of said pair of gears, said idler gear being mounted for rocking movement about the axis of one of the said gears, and means for yieldingly urging said idler gear toward said plane into driving engagement with the other of said gears, whereby said idler gear is operative to maintain driving engagement with both of said gears in all positions of vertical adjustment of said vertically shifting sheet carrier and the gear connected thereto.

5. The combination with apparatus which cuts box blanks from sheets of box making material in such a manner that removable waste material is left in normal sheet position relative to the blanks, of a rotatable member provided with a pin projecting therefrom, said rotatable member being so mounted that said pin travels in an arcuate path toward and from the path of travel of the sheet material in said apparatus and into impaling engagement with said material, said rotary member and pin being driven in such synchronized relation to said cutting mechanism that said pin impales and withdraws said waste material from said normal position, said member having a circumferential slot in its peripheral portion and said slot having a bottom or inner portion of greater width than its top or outer portion, a pin mounting block positioned in said slot and having a cross sectional shape approximately corresponding to that of said slot, said block being movable in said slot circumferentially of said rotatable member to a selected position of adjustment around the periphery of said member, and means for locking said mounting block in selected position on said member.

6. The combination with apparatus which cuts box blanks from sheets of box making material in such a manner that removable waste material is left in normal sheet position relative to the blanks, of a rotatable member provided with a pin projecting therefrom, said rotatable member being so mounted that said pin travels in an arcuate path toward and from the path of travel of the sheet material in said apparatus and into impaling engagement with said material, said rotary member and pin being driven in such synchronized relation to said cutting mechanism that said pin impales and withdraws said waste material from said normal position, said member having a circumferential slot in its peripheral portion and said slot having a bottom or inner portion of greater width than its top or outer portion, a pin mounting block positioned in said slot and having a cross sectional shape approximately corresponding to that of said slot, said block being movable in said slot circumferentially of said rotatable member to a selected position of adjustment around the periphery of said member, and means for locking said mounting block in selected position on said member, said pin mounting block having a tapered opening extending thereinto, and said impaling pin having a tapered shank frictionally seated in said tapered opening in said mounting block.

7. The combination with apparatus which cuts box blanks from sheets of box making material in such a manner that removable waste material is left in normal sheet position relative to the blanks, of a rotatable member provided with a pin projecting therefrom, said rotatable member being so mounted that said pin travels in an arcuate path toward and from the path of travel of the sheet material in said apparatus and into impaling engagement with said material, said rotary member and pin being driven in such synchronized relation to said cutting mechanism that said pin impales and withdraws said waste material from said normal position, said member having a circumferential slot in its peripheral portion and said slot having a bottom or inner portion of greater width than its top or outer portion, a pin mounting block positioned in said slot and having a cross sectional shape approximately corresponding to that of said slot, said block being movable in said slot circumferentially of said rotatable member to a selected position of adjustment around the periphery of said member, and means for locking said mounting block in selected position on said member, said pin mounting block having a tapered opening extending thereinto, said impaling pin having a tapered shank frictionally seated in said tapered opening in said mounting block, and a projecting part having a conical free end portion adapted to pierce said sheet material and a transversely reduced neck portion intermediate said conical portion and said shank for receiving the pierced sheet material and retaining the same on said pin to thereby enable said pin to effect displacement of portions of said sheet material substantially as described.

8. The combination with apparatus which cuts box blanks from sheets of box making material in such a manner that removable waste material is left in normal sheet position relative to the blanks, of a rotatable shaft having one or more discs mounted thereon, said discs being provided with barbed pins projecting therefrom for impaling and withdrawing said waste material, and a pair of relatively spaced frame members having bearings therein rotatably receiving end portions of said rotatable shaft to rotatably support the same, one of said bearings comprising an element which is nonrotatably but axially slidably mounted in one of said frame members fixedly in coaxial relation to the operative position of said rotatable shaft, a member rotatably and axially fixedly mounted in said last mentioned frame member, helical groove and pin means interconnecting said member and element for effecting axial movement of said element as an incident to rotation of said member, whereby said element is movable from operative shaft supporting position to an outwardly retracted position free of the end portion of said shaft to thereby facilitate removal of said shaft, and means mounted on said frame and operatively connected to said rotatable member for effecting rotation thereof selectively to effect retraction of said element as aforesaid and projection thereof to said operative position.

9. The combination with apparatus which cuts box blanks from sheets of box making material in such a manner that removable waste material is left in normal sheet position relative to the blanks, of a pair of frame members, a member rotatably mounted in said frame members and of less length than the distance between said frame members, said rotatably mounted member having means for engaging and removing said waste material as an incident to rotation of said member, and means for rotatably mounting said member in said frame members comprising a pair of stub shafts having separable supporting connections respectively, with end portions of said rotatable member, said shafts being respectively journaled in said frame members and one of said shafts being mounted for axial movement so as to permit endwise withdrawal thereof from supporting engagement with said rotatable member, means for facilitating said endwise withdrawal of said shaft, and the other of said shafts being driven and splined to said rotatable member for driving the same, said other shaft having a flaring socket removably receiving the adjacent end portion of said rotatable member, whereby lateral shifting of the opposite end portion of said rotatable member from alignment with said withdrawable shaft is permitted to thereby facilitate endwise separation of said splined connection and removal of said rotatable member from the apparatus substantially as described.

References Cited in the file of this patent

UNITED STATES PATENTS

| Number | Name | Date |
|---|---|---|
| 192,721 | Wademan | July 3, 1877 |
| 293,232 | Doersch | Feb. 12, 1884 |
| 879,616 | Eynon | Feb. 18, 1908 |
| 1,255,810 | Taylor | Feb. 5, 1918 |
| 1,977,812 | Swift, Jr. | Oct. 23, 1934 |
| 1,983,708 | Ruble et al. | Dec. 11, 1934 |
| 1,987,224 | Bergstein | June 8, 1935 |
| 2,366,999 | Campbell | Jan. 9, 1945 |
| 2,534,166 | Gierke et al. | Dec. 12, 1950 |